(12) United States Patent
Kim et al.

(10) Patent No.: US 7,950,132 B2
(45) Date of Patent: May 31, 2011

(54) METHOD FOR MANUFACTURING LIQUID CRYSTAL DEVICE

(75) Inventors: Sungmin Kim, Kyungbuk (KR); Yongjin Kim, Gumi (KR); Byungsu Chae, Gumi (KR); Youngjin Lee, Osan (KR)

(73) Assignees: LG Display Co., Ltd., Seoul (KR); LG Electronics Inc., Seoul (KR)

( * ) Notice: Subject to any disclaimer, the term of this patent is extended or adjusted under 35 U.S.C. 154(b) by 0 days.

(21) Appl. No.: 12/503,347

(22) Filed: Jul. 15, 2009

(65) Prior Publication Data

US 2010/0011566 A1  Jan. 21, 2010

(30) Foreign Application Priority Data

Jul. 18, 2008  (KR) .................. 10-2008-0069979

(51) Int. Cl.
*G02F 1/1345* (2006.01)
*H01S 4/00* (2006.01)

(52) U.S. Cl. ............... 29/592.1; 29/564.7; 29/564.6; 29/407.01; 349/192

(58) Field of Classification Search ............... 29/592.1, 29/594, 595, 729, 739–742, 407.01, 33 M, 29/33 F; 349/187–191
See application file for complete search history.

(56) References Cited

U.S. PATENT DOCUMENTS

| | | | |
|---|---|---|---|
| 7,111,755 B2 * | 9/2006 | Koyama et al. | 222/1 |
| 7,559,277 B2 * | 7/2009 | Heo et al. | 101/337 |
| 7,667,816 B2 * | 2/2010 | Hirato | 349/189 |
| 7,701,546 B2 * | 4/2010 | Yu et al. | 349/187 |
| 2007/0002258 A1 * | 1/2007 | Wu | 349/155 |

FOREIGN PATENT DOCUMENTS

| | | |
|---|---|---|
| CN | 101135802 | 3/2008 |
| CN | 101142513 | 3/2008 |
| WO | WO 2007/097058 | 8/2007 |

* cited by examiner

*Primary Examiner* — Minh Trinh
(74) *Attorney, Agent, or Firm* — Morgan, Lewis & Bockius LLP

(57) ABSTRACT

Disclosed is an integrated device which can peel a protective film from a board assembly and mount the board assembly on a backlight unit. The integrated peeling and mounting device includes: an index rotary unit having a shaft for rotating heads facing in different directions; an alignment calibration unit for calibrating an aligned state of the board assembly and the backlight unit; and a mounting unit for mounting a board assembly adsorbed to a first head of the index rotary unit on the backlight unit.

7 Claims, 20 Drawing Sheets

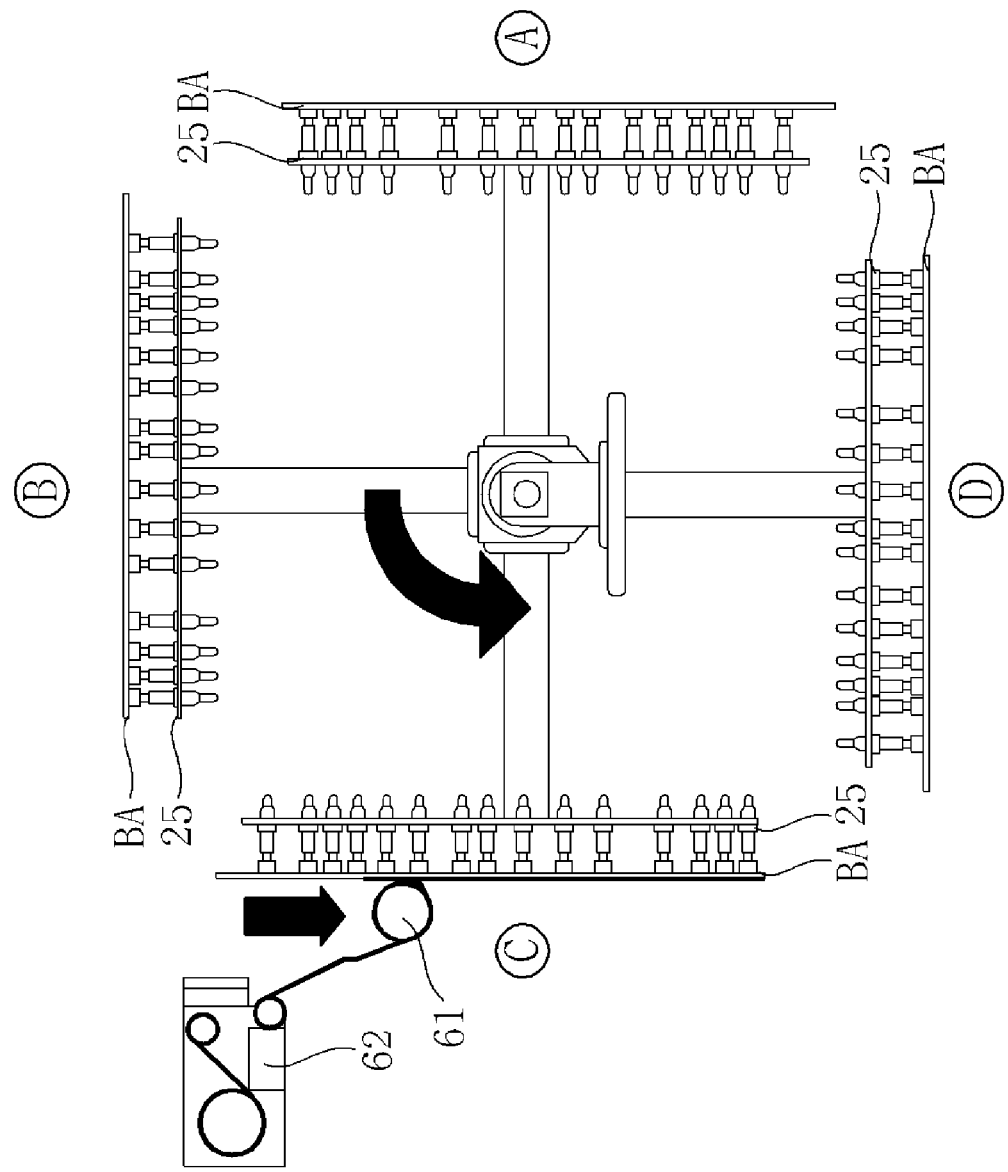

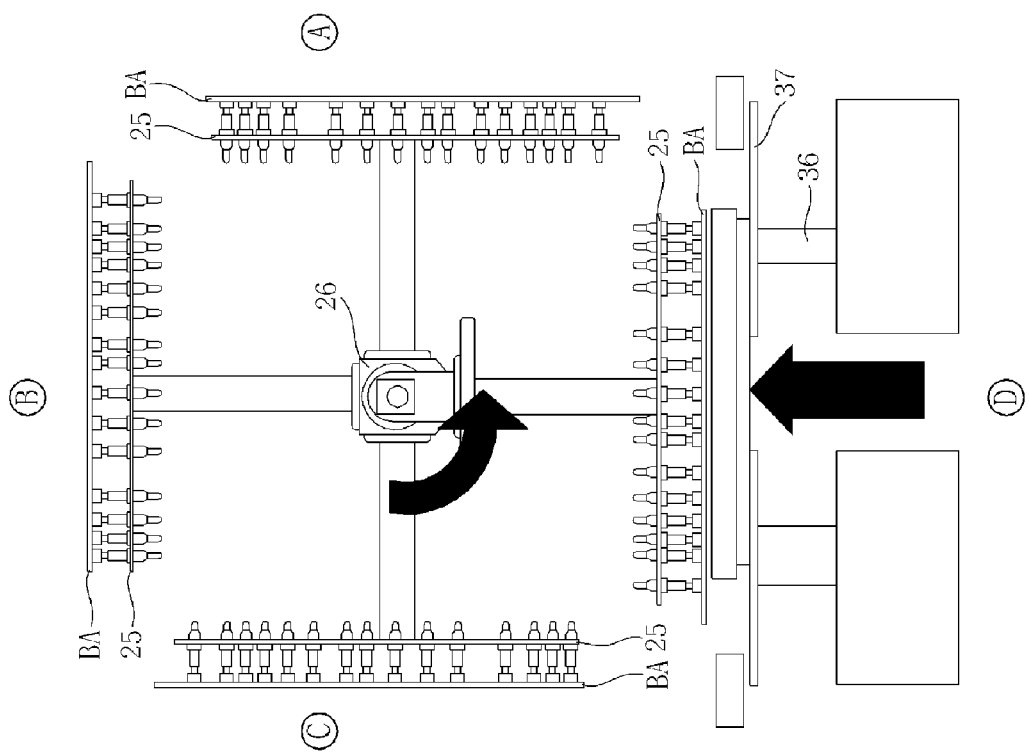

METHOD FOR MANUFACTURING LIQUID CRYSTAL DEVICE

This application claims the benefit of Korean Patent Application No. 10-2008-0069979 filed on Jul. 18, 2008, the entire contents of which is incorporated herein by reference for all purposes as if fully set forth herein.

BACKGROUND

1. Field

This document relates to an integrated device which can peel a protective film from a board assembly and mount the board assembly on a backlight unit.

Furthermore, this document relates to a method for manufacturing a liquid crystal display device which can perform both film peeling and mounting by using the integrated device.

2. Related Art

An active matrix driving type liquid crystal display device displays moving pictures by using a thin film transistor (hereinafter, "TFT") as a switching element. This liquid crystal display device is small-sized compared to a cathode ray tube (CRT), and hence is rapidly replacing a cathode ray tube (CRT) by being applied to televisions, as well as displays of mobile information devices, office machines, computers, etc.

A liquid crystal display device includes, as shown in FIG. 1, a board assembly BA and a backlight unit BL.

The board assembly BA includes a liquid crystal panel sandwiched between an upper glass substrate and a lower glass substrate, polarizers attached on top and bottom surfaces of the liquid crystal display panel, a TCP (Taper Carrier Package) for connecting source and gate drive integrated circuits (ICs) to data lines and gate lines of the liquid crystal display panel, printed circuit boards (PCBs), and flexible printed circuits (FPCs) connected between the PCBs.

The backlight unit BL is an assembly of a light source, a reflection sheet, a light guide plate, a diffusion sheet, a prism sheet, a mold frame, an inverter, etc. The light source may be a lamp, such as a cold cathode fluorescent lamp (CCFL) and an external electrode fluorescent lamp (EEFL), or a light emitting diode. The inverter is a power driving circuit for turning on the light source.

The board assembly BA is mounted on the backlight unit BL in a film peeling and mounting process. In the film peeling and mounting process, a lower polarizer protective film 11 attached on the lower surface of the panel of the board assembly BA is peeled, and then the board assembly BA and the backlight unit BL are aligned and the board assembly BA is mounted on the backlight unit BL.

A film peeling and mounting device as shown in FIG. 2 carries out the process in the order of conveyance of the board assembly BA, peeling of the lower protective film of the board assembly BA, feeding of the board assembly BA, alignment of the board assembly BA and the backlight unit BL, and mounting of the board assembly BA on the backlight unit BL. This film peeling and mounting device is advantageous in reducing the process time because a process of peeling the lower polarizer protective film from the board assembly BA and then feeding the board assembly BA and a process of feeding the backlight unit BL to a mounting position are separated, but the device is large-sized and complicated. Further, the film peeling and mounting device shown in FIG. 2 has a problem that since the standby time of the board assembly BA is lengthened before the board assembly BA is mounted on the backlight unit BL, the board assembly BA may be contaminated by impurities, thereby increasing the probability of defects of the board assembly BA. The arrow in FIG. 2 is a feeding path of the board assembly BA.

The film peeling and mounting device shown in FIG. 3 carries out the process in the order of feeding of the board assembly BA, peeling of the lower protective film of the board assembly BA, alignment of the board assembly BA and the backlight unit BL, and mounting of the board assembly BA on the backlight unit BL. While this film peeling and mounting device has an advantage that impurity defects of the board assembly BA are small because the device is relatively small in size and mounting is performed immediately after film peeling, it is difficult to reduce the processing time since the film peeling process and the film mounting process are continuously performed in 1 cycle. The arrow in FIG. 3 is a feeding path of the board assembly BA.

SUMMARY

The present invention has been made in an effort to solve the problems occurring in the prior art, and an aspect of this document is to provide an integrated peeling and mounting device which can peel a protective film from a board assembly and can make the device smaller in size and minimize the processing time by mounting the board assembly on the backlight unit.

Another aspect of this document is to provide a method for manufacturing a liquid crystal display device which can process both film peeling and mounting by using the integrated device.

To achieve the above aspects, there is provided an integrated peeling and mounting device according to an exemplary embodiment of the present invention, including: an index rotary unit having a shaft for rotating heads facing in different directions; an alignment calibration unit for calibrating an aligned state of the board assembly and the backlight unit; and a mounting unit for mounting a board assembly adsorbed to a first head of the index rotary unit on the backlight unit. A film is peeled from the board assembly attached to a second head of the index rotary unit during the operation of the mounting unit.

There is provided a method for manufacturing a liquid crystal display device according to an exemplary embodiment of the present invention, including: rotating a shaft of an index rotary unit to which heads facing in different directions are connected, and mounting a board assembly attached to a first head of the index rotary unit by calibrating an aligned state of the board assembly and the backlight unit; and peeling a film from the board assembly attached to a second head of the index rotary unit. Both of the processes are simultaneously performed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 9A and 9B are a right side view showing an automatic film peeling process in the index rotary unit shown in FIGS. 4 to 6;

FIG. 10 is a right side view showing a mounting process performed by the index rotary unit and the mounting unit which are shown in FIGS. 4 and 6;

DETAILED DESCRIPTION

Figure 1:
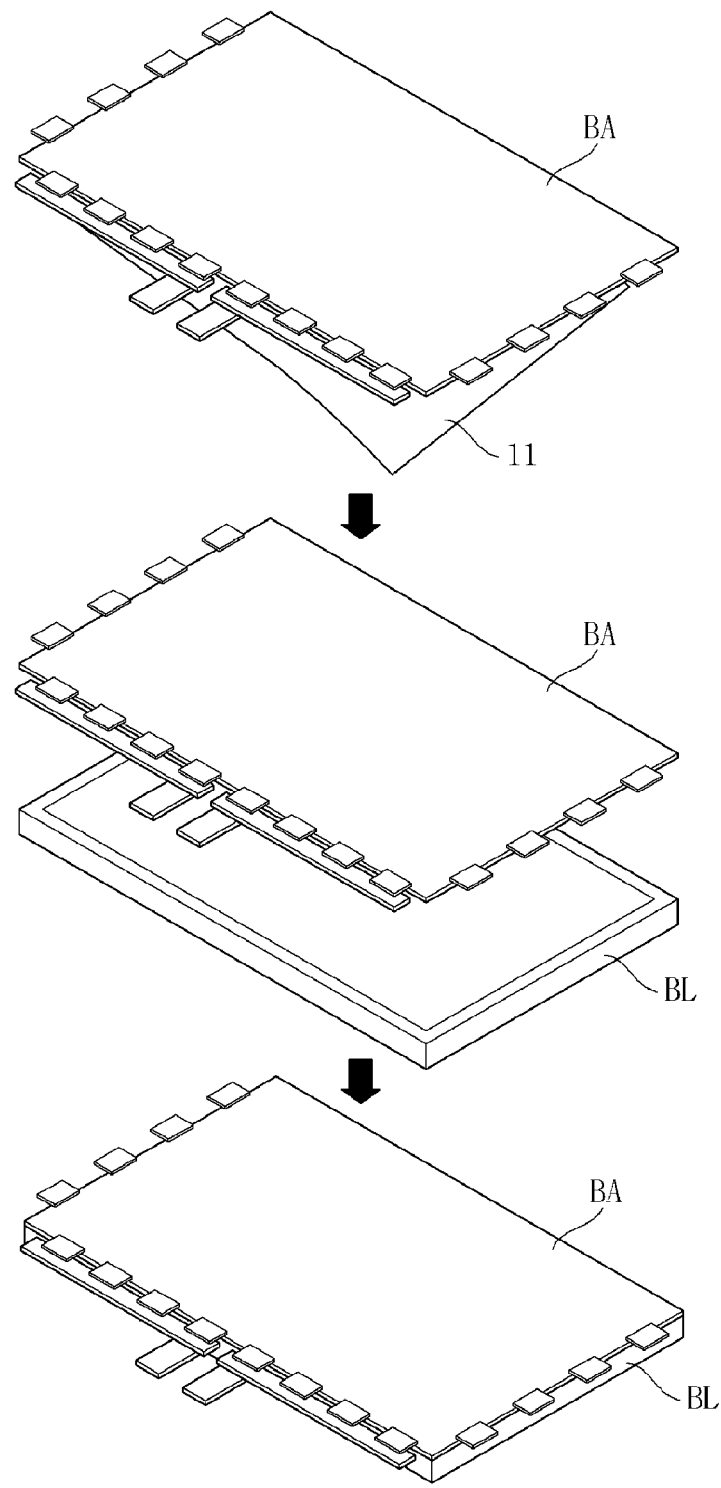
FIG. 1 is a perspective view showing a process of peeling a film from a board assembly and a process of mounting the board assembly on a backlight unit.
Figure 2:
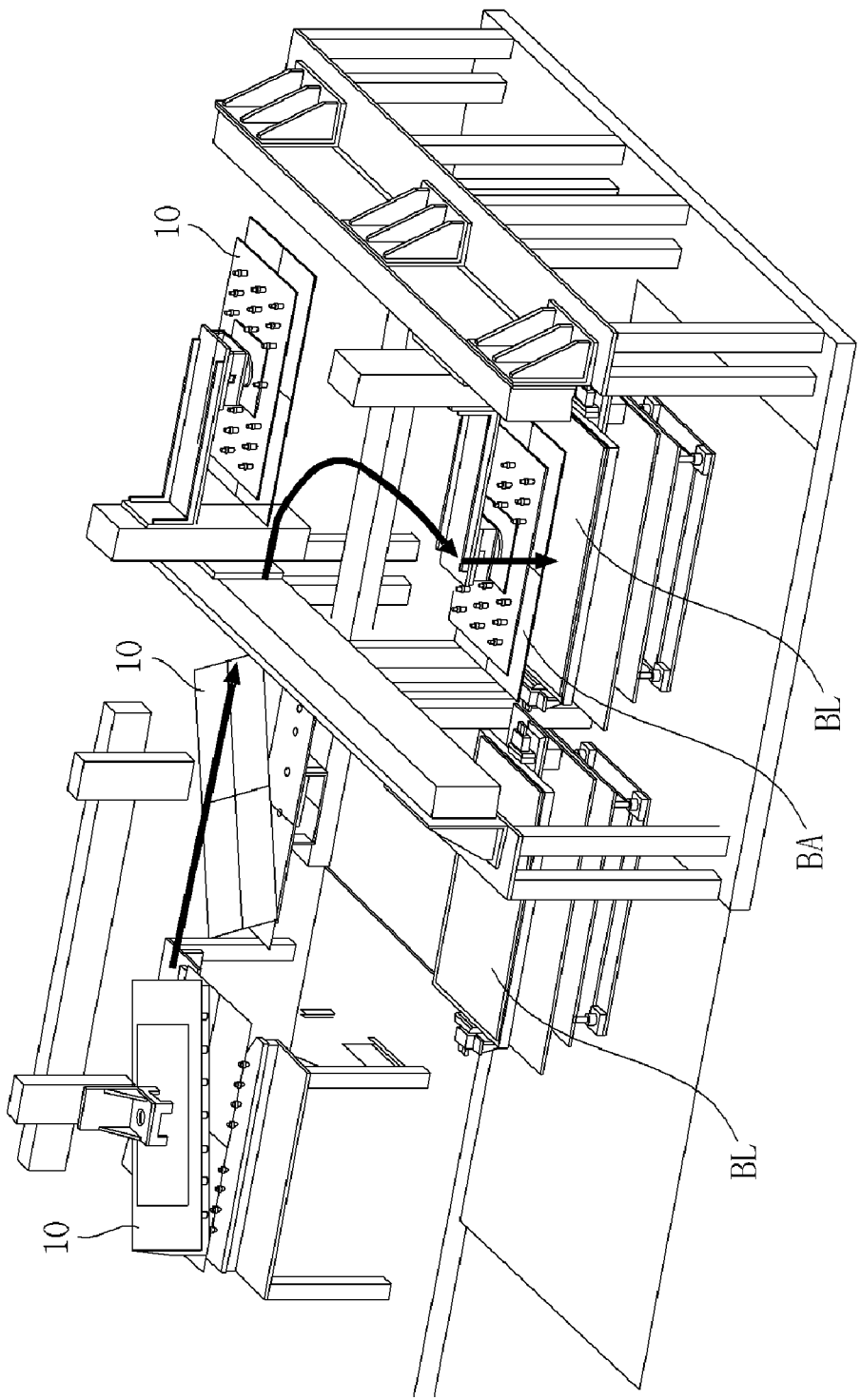
FIGS. 2 and 3 are perspective views showing conventional film peeling and mounting devices.
Figure 3:
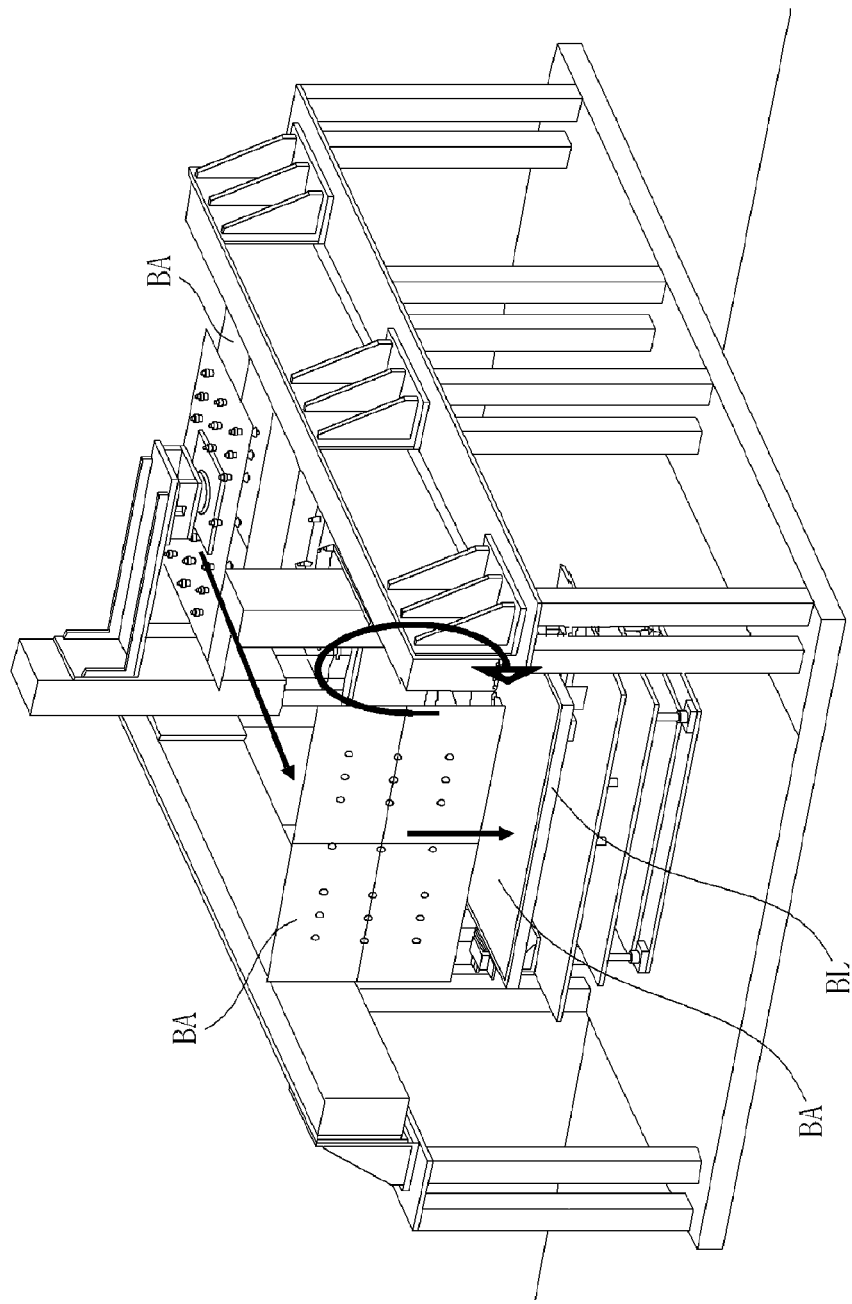

A method for manufacturing a liquid crystal display device according to an exemplary embodiment of the present invention includes a liquid crystal display panel substrate cleaning process, a substrate patterning process, an alignment film forming/rubbing process, a substrate bonding and liquid crystal dropping process, a drive circuit mounting process, a test process, a repair process, a backlight unit BL assembling process, a process of mounting a board assembly BA on a backlight unit BL simultaneously while peeling a film from the board assembly.

In the substrate cleaning process, contaminated impurities are peeled with a cleaning solution from surfaces of upper and lower glass substrates of a liquid crystal display panel. The substrate patterning process includes a process of forming and patterning various thin film materials, such as signal lines including data lines and gate lines, thin film transistors TFTs, pixel electrodes, etc. on the lower glass substrate, and a process of forming and patterning various thin film materials, such as a black matrix, color filters, common electrodes, etc. on the upper glass substrate. In the alignment film forming/rubbing process, an alignment film is coated on the glass substrates, and the alignment film is rubbed with a rubbing cloth or optically aligned. Through this series of processes, formed on the lower glass substrate of the liquid crystal display panel is a pixel and TFT array including data lines for supplying video data voltages, gate lines that cross the data lines and to which scan signals, i.e., gate pulses are supplied, TFTs formed at the crossings of the gate lines and the data lines, pixel electrodes of respective liquid crystal cells coupled to the TFTs, and storage capacitors. A shift register of a gate drive circuit for generating scan signals may be formed simultaneously with the pixel and TFT array in the substrate patterning process. A black matrix, color filters, and common electrodes are formed on the upper glass substrate of the liquid crystal display panel. In a vertical electric field driving system such as a twisted nematic (TN) mode or a vertical alignment (VA) mode, the common electrodes are formed on the upper glass substrate. On the other hand, in a horizontal electric field driving system such as an in-plane switching (IPS) mode or a fringe field switching (FFS) mode, the common electrodes are formed on the lower glass substrate together with the pixel electrodes. Polarizers are attached to the upper and lower glass substrates, respectively, and a polarizer protective film is attached thereon.

In the substrate bonding and liquid crystal dropping process, a sealant is drawn on any one of the upper and lower glass substrates of the liquid crystal display panel, and liquid crystal is dropped onto the other substrate. The dropping of liquid crystal onto the lower glass substrate will be described by taking an example in which a UV-hardening sealant is formed on the upper glass substrate, the upper glass substrate with the sealant is overturned and fixed to an upper stage, and the lower glass substrate with the liquid crystal dropped thereon is fixed to a lower stage. Next, in the substrate bonding and liquid crystal dropping process, the upper glass substrate and the lower glass substrate are aligned in a chamber, and then a vacuum pump is driven so that a pressure of the chamber is changed into a vacuum state. At this time, a cell gap of the liquid crystal layer between the substrates is larger than a cell gap of a design value. Next, when nitrogen $N_2$ is applied and the pressure of the chamber is adjusted to atmospheric pressure, the cell gap is adjusted to the design value by a pressure difference between the pressure in the bonded glass substrates and an external atmospheric pressure. In this state, in the substrate bonding and liquid crystal dropping process, a UV light source is turned on to irradiate UV rays to the sealant through the upper glass substrate to harden the sealant.

In the drive circuit mounting process, an integrated circuit IC of a data drive circuit is mounted on the lower glass substrate of the liquid crystal display panel by using a COG (Chip On Glass) process or a TAB (Tape Automated Bonding) process. The gate drive circuit may be formed on the lower glass substrate of the liquid crystal display panel as described above, or may be formed on the lower glass substrate by the TAB process in the drive circuit mounting process. Next, in the drive circuit mounting process, the integrated circuit IC and a PCB (printed circuit board) are connected by a FPC (Flexible Printed Circuit board) or a FFC (Flexible Flat Cable).

The test process includes a test of the integrated circuit, a test of the signal lines including the data lines and gate lines formed on the lower glass substrate, a test to be performed after the formation of the pixel electrodes, a test to be performed after the substrate bonding and liquid crystal dropping process, and a turn-on test. In the repair process, a recovery process is performed on signal line defects and TFT defects that are identified as being repairable.

Through this series of processes, the board assembly BA is completed.

The backlight unit BL assembling process includes, for example, in the case of assembling an edge type backlight unit, a process of assembling a light source, a reflection sheet, a light guide plate, a diffusion sheet, and a prism sheet on a mold frame, assembling a panel guide on the mold frame, and then connecting an inverter to the light source. A direct type backlight unit assembling process includes a process of accommodating a light source in a bottom cover whose top is opened, assembling a mold frame, a diffusion plate, a diffusion sheet, a prism sheet, and a panel guide on the bottom cover, and then connecting an inverter to the light source. A lamp, such as a cold cathode fluorescent lamp (CCFL) and an external electrode fluorescent lamp (EEFL), or a light emitting diode may be used as the light source. The inverter is a power driving circuit for turning on the light source.

Figure 4:
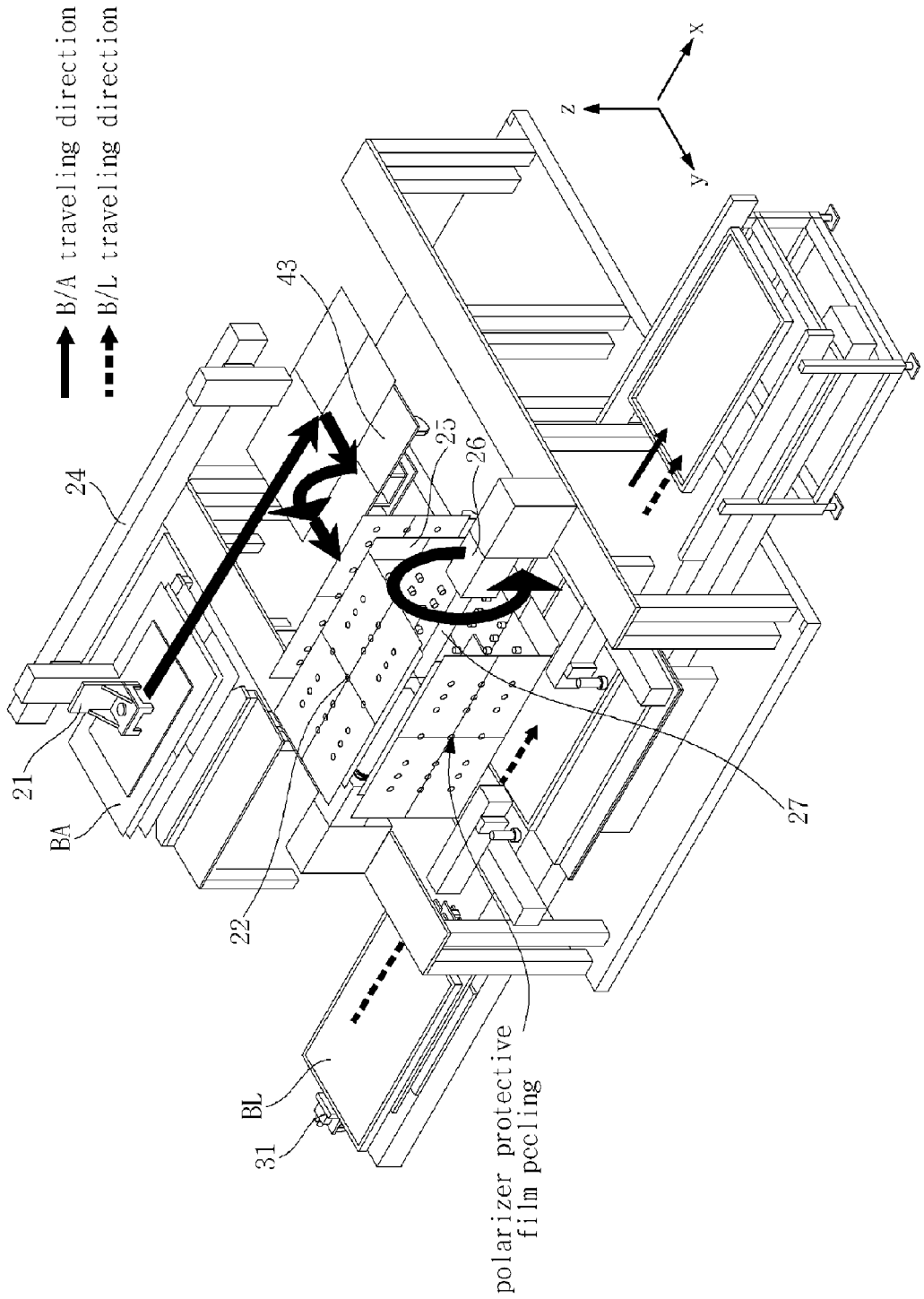
FIG. 4 is a perspective view showing an outer appearance of an integrated peeling and mounting device.

In the process of mounting the board assembly BA on the backlight unit BL simultaneously while peeling the film from the board assembly BA, a process of supplying the board assembly BA to a vertical index rotary unit by use of the device as shown in FIG. 4, a process of reading out a barcode from the board assembly BA, a process of peeling the polarizer protective film of the board assembly BA, and a process of mounting the board assembly BA on the backlight unit BL are simultaneously performed.

Hereinafter, an exemplary embodiment of the present invention will be described with reference to FIGS. 4 to 19.

Figure 5:
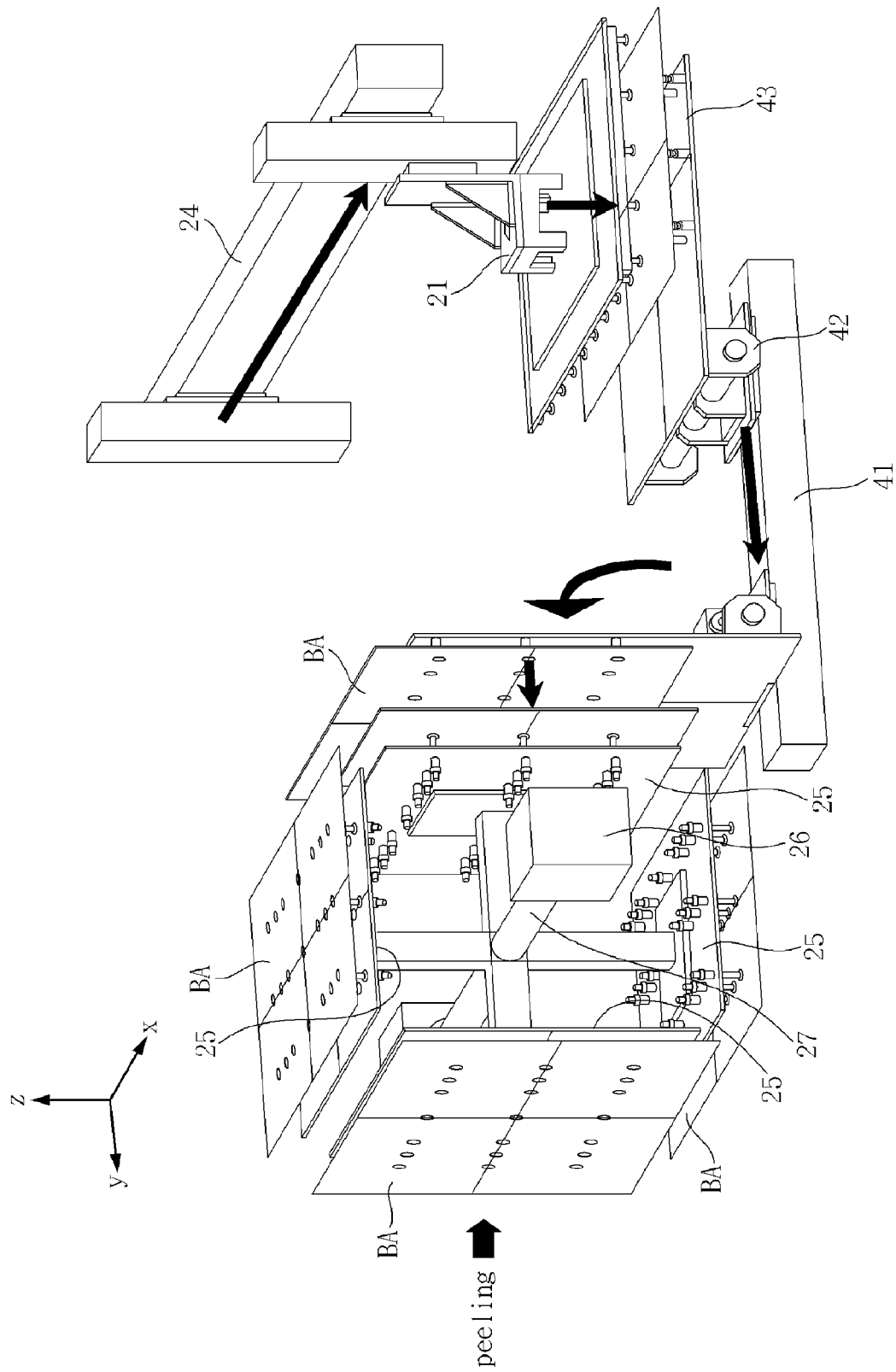
FIG. 5 is a perspective view showing a board assembly feeding unit, a tilting unit, and an index rotary unit, respectively, in the integrated peeling and mounting device shown in FIG. 4.
Figure 6:
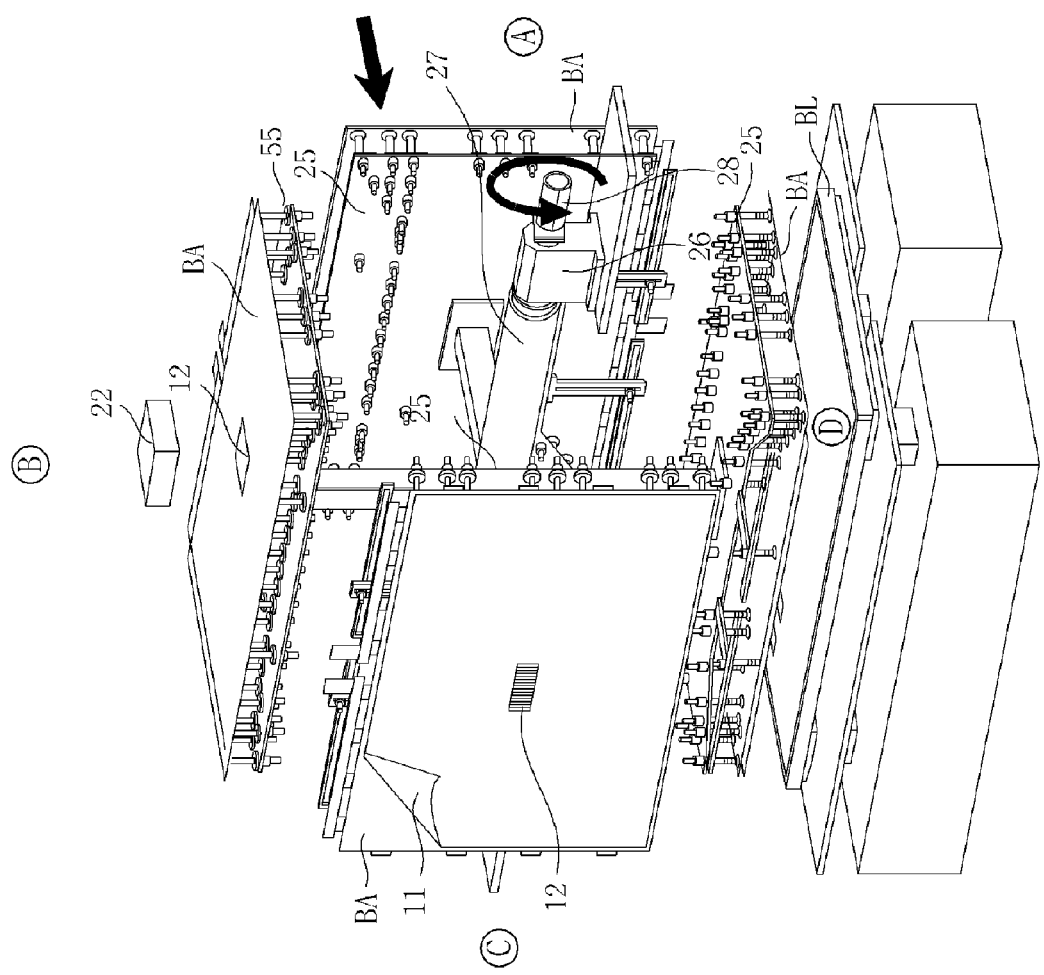
FIG. 6 is a perspective view showing the index rotary unit and a mounting unit, separately, in the integrated peeling and mounting device shown in FIG. 4.

Referring to FIGS. 4 to 11, the integrated peeling and mounting device according to the exemplary embodiment of the present invention includes a board assembly BA feeding unit, a tilting unit, an index rotary unit 26, a backlight unit BL feeding unit, and a mounting unit. In FIGS. 4 and 5, the red arrow indicates a movement path of the board assembly BA, and the blue arrow indicates a movement path of the backlight unit BL.

In the integrated peeling and mounting device according to the exemplary embodiment of the present invention, as shown in FIG. 4, the board assembly BA supplied in the previous process is fed along an x-axis by use of the board assembly BA feeding unit, and then the board assembly BA is vertically raised and transferred to the index rotary unit 26. Also, the integrated peeling and mounting device according to the exemplary embodiment of the present invention simultaneously performs the board assembly BA supply process, the process of peeling the polarizer protective film of the board assembly BA, and the process of mounting the board assembly BA on the backlight unit BL by feeding the backlight unit BL to the mounting unit under the index rotary unit 26 by use of the backlight unit BL feeding unit and driving the mounting unit while rotating adsorption heads 25 attached to four surfaces of the index rotary unit 26. The mounting process includes the process of aligning the board assembly BA and the backlight unit BL. Further, the integrated peeling and mounting device according to the exemplary embodiment of the present invention reads out the barcode of the board assembly BA and the barcode of the backlight unit BL simultaneously with the board assembly BA supply process, the process of peeling the polarizer protective film of the board assembly BA, and the process of mounting the board assembly BA on the backlight unit BL as it will be described later.

As shown in FIGS. 4 and 5, the board assembly BA feeding unit includes a head 21 with an adsorption pad attached thereto and a two-axis orthogonal robot 24, and feeds the board assembly BA to the tilting unit. The head 21 is mounted on a z-axis guide of the two-axis orthogonal robot 24 and vacuum-adsorbs the board assembly BA sheet by sheet. The two-axis orthogonal robot 24 includes a z-axis guide on which the head 21 is mounted and an x-axis guide for moving the z-axis guide to an x-axis direction. The two-axis orthogonal robot 24 drives the z-axis guide to vertically lower it along the head 21 from the initial position of the head 21 and then raise the head 21 with the board assembly BA adsorbed thereto, and then drives the x-axis guide to move the z-axis guide forward toward the tilting unit along with the head 21 with the board assembly BA adsorbed thereto. The head 21 releases vacuum on an adsorption head 43 of the tilting unit to transfer the board assembly BA to the tilting unit and retreats to the initial position by means of the two-axis orthogonal robot 24.

As shown in FIGS. 4 and 5, the tilting unit includes the adsorption head 43, a hinge 42, and a single-axis robot 41, and vertically raises the board assembly BA supplied in a horizontal posture and transfers it to one adsorption head 25 of the index rotary unit 26. The adsorption head 43 vacuum-adsorbs the board assembly BA transferred from the head 21 of the two-axis orthogonal robot 24 and then moves the board assembly BA toward the one adsorption head 25 of the index rotary unit 26 along the y-axis single-axis robot 41. Next, the adsorption head 43 turns at approximately 90° by the hinge 42 to vertically raise the posture of the board assembly BA, and is further moved by an infinitesimal distance to transfer the board assembly BA to the one adsorption head 25 of the index rotary unit. In this transfer process, the adsorption head 43 of the tilting unit releases vacuum after the board assembly BA is adsorbed to the adsorption head 25 of the index rotary unit. The adsorption head 43 retreats to the original position by means of the single-axis robot 41 so as to receive the next board assembly BA. The hinge 42 of the tilting unit is driven by an air cylinder or a server motor to rotate the adsorption head 43.

The index rotary unit 26 is implemented as a vertical index rotary unit including a shaft 27 rotating at 360°, four arms vertically connected to the shaft 27 in four directions of up, down, left, and right, and four adsorption heads 25 respectively mounted on the arms, and rotates the board assembly BA transferred from the tilting unit gradually by 90° each time. Each of the arms becomes spaced apart by 90° from the other arms neighboring around the shaft 27. Each of the adsorption heads 25 is installed such that a plurality of adsorption heads faces the outside, i.e., the board assembly BA. While the first adsorption head of the index rotary unit 26 receives the board assembly BA from the tilting unit, the barcode of the board assembly BA adsorbed to the second adsorption head is read out, and the polarizer protective film of the board assembly BA adsorbed to the third adsorption head is peeled. At the same time, the board assembly BA adsorbed to the fourth adsorption head is aligned with the backlight unit BL and then mounted on the backlight unit BL. Therefore, the board assembly BA supply process, the process of peeling the polarizer protective film from the board assembly BA, the process of mounting the board assembly BA on the backlight unit BL, and the reading of the barcode of the board assembly BA and the barcode of the backlight unit BL can be simultaneously performed by the rotation of the four-directional adsorption heads of the index rotary unit 26.

A barcode reader 22 may be disposed near the heads of the index rotary unit 26, for example, above or under the heads of the index rotary unit 26. The barcode reader 22 reads out the barcode printed on the board assembly BA. The barcode printed on the board assembly BA records panel information, product traceability information, and so on of the liquid crystal display panel. Only vacuum lines are formed inside the adsorption heads 25 of the index rotary unit 26 and no electrical and signal cables are connected thereto so that the bottom surface to which a lower polarizer protective film may face the outside in order to peel the lower polarizer protective film attached on the lower glass substrate and allow the board assemblies BA to be mounted on the backlight unit BL without any change in posture. When the electrical and signal cables connected to the adsorption heads 25, the index rotary unit 26 continues to rotate in the same direction and hence the electrical and signal cables are twisted. Thus, the driving of the index rotary unit 26 may be stopped or may malfunction. A vacuum cable is connected to the index rotary unit 26 through a slip ring 28 which maintains its posture without rotating along the index rotary unit 26.

In a case where a barcode is printed on the upper surface of the board assembly BA, a barcode reader may be installed in an inner space surrounded by the adsorption heads 25.

Figure 9B:
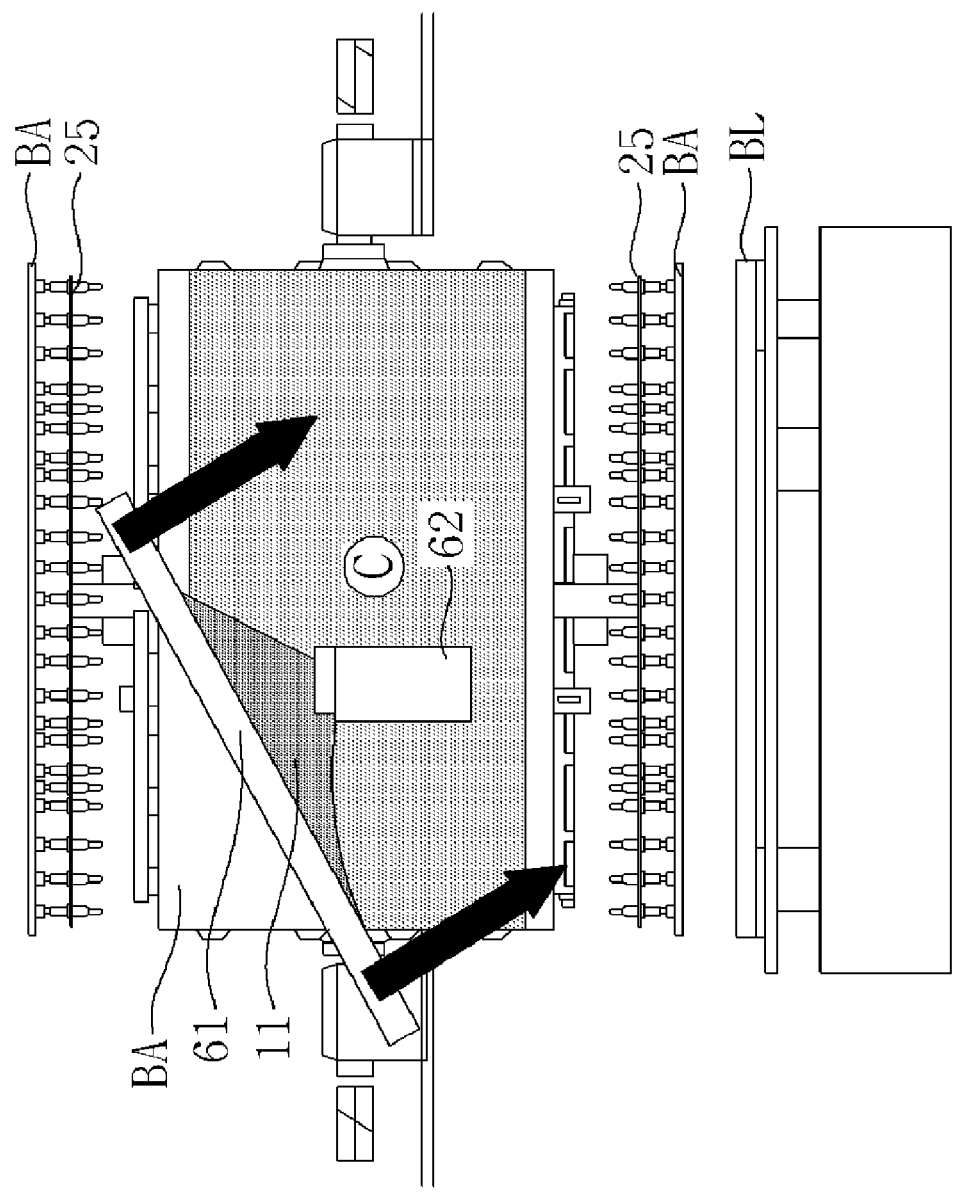
Figure 11:
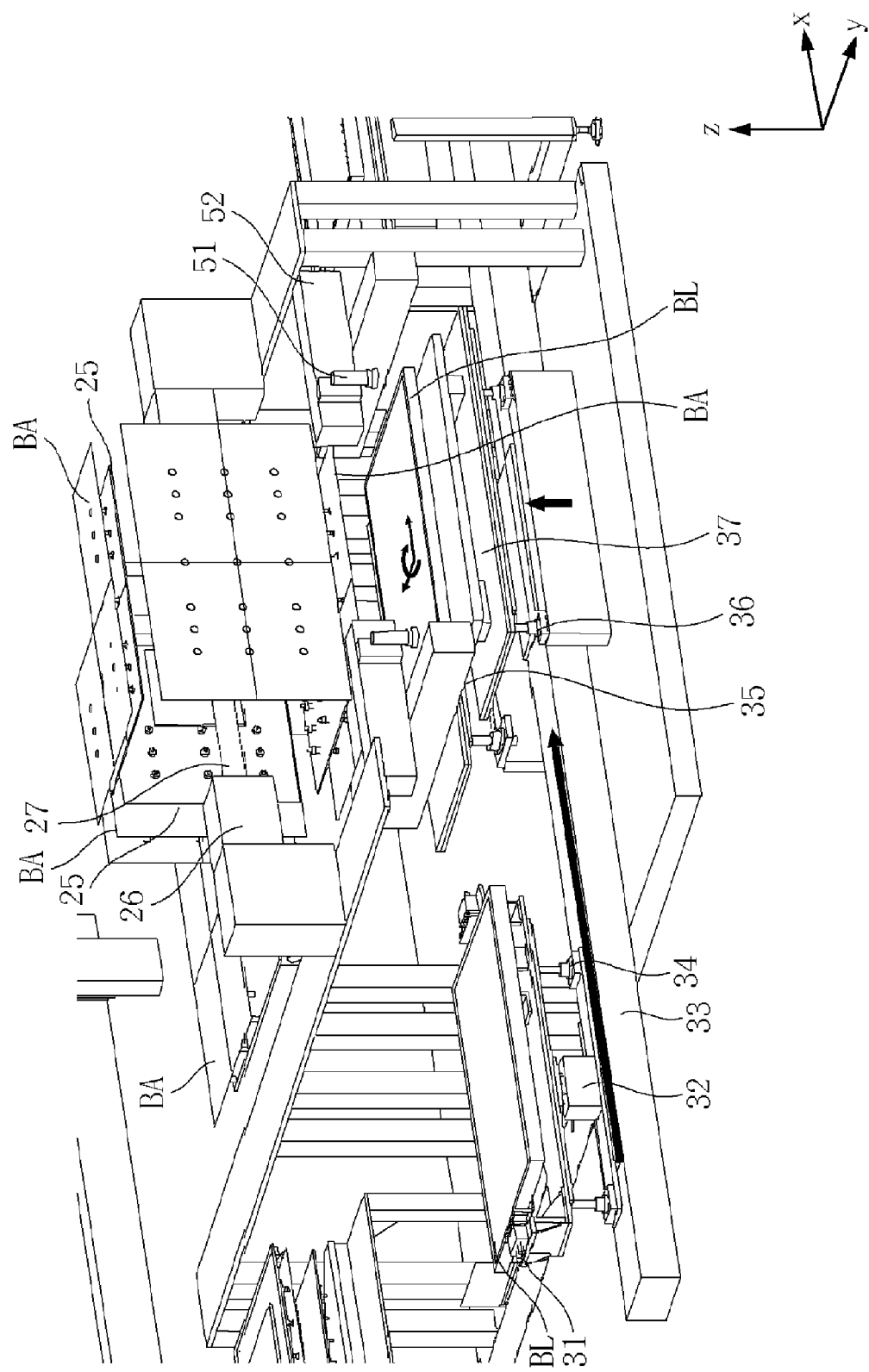
FIG. 11 is a perspective view from a different angle showing the index rotary unit, backlight unit feeding unit, and mounting unit in the integrated peeling and mounting device shown in FIGS. 4 and 5.

An automatic peeling machine 62 may be installed as shown in FIGS. 9A and 9B near the adsorption heads 25 facing a film peeling direction in the index rotary unit 26. As shown in FIGS. 9A and 9B, the automatic peeling machine 62 automates film peeling by automatically processing the process of attaching a polarizer protective film to a tape bar unit 61 on one periphery of the board assembly BA, isolating the tape bar unit 61 from the board assembly BA, and then moving the tape bar unit 61 forward in a diagonal direction from one periphery of the board assembly BA according to a preset program. This automatic peeling machine 62 is not limited thereto but may be implemented as any automatic peeling machines which are well-known and commonly used.

The backlight unit BL feeding unit includes, as shown in FIGS. 4 to 11, a chucking unit 31, an up/down driving unit 32, a single-axis robot 33, and an up/down guide shaft 34, and feeds the backlight unit BL supplied from the backlight unit assembling process toward the mounting unit. The chucking unit 31 moves in an x-axis direction along the x-axis single axis robot 33, and ascends and descends along the up/down shaft. This chucking unit 31 is driven by an air cylinder to chuck both sides of the backlight unit BL in the initial position, is moved, along with the up/down driving unit 32 and the up/down guide shaft 34, to the mounting unit along the x-axis single axis robot 33, and releases chucking and returns to the initial position along the single-axis robot 33. The up/down driving unit 32 raises the chucking unit 31 in the initial position and then moves toward the mounting unit along the single-axis robot 33 to lower the chucking unit 31 when the board assembly BA is transferred to the mounting unit from the chucking unit 31, and then returns to the initial position along the single-axis robot 33. A barcode reader 35 for reading out a barcode printed on the backlight unit BL is installed on the movement path of the backlight unit BL. This barcode reader 35 is installed on any one of the movement path of the backlight unit BL before arrival to the mounting unit, a region near the mounting unit, and the discharge path of the board assembly BA and backlight unit BL mounted, and reads out the barcode of the backlight unit BL. The barcode printed on the backlight unit BL includes backlight unit information, production traceability information, and so on.

Figure 12:
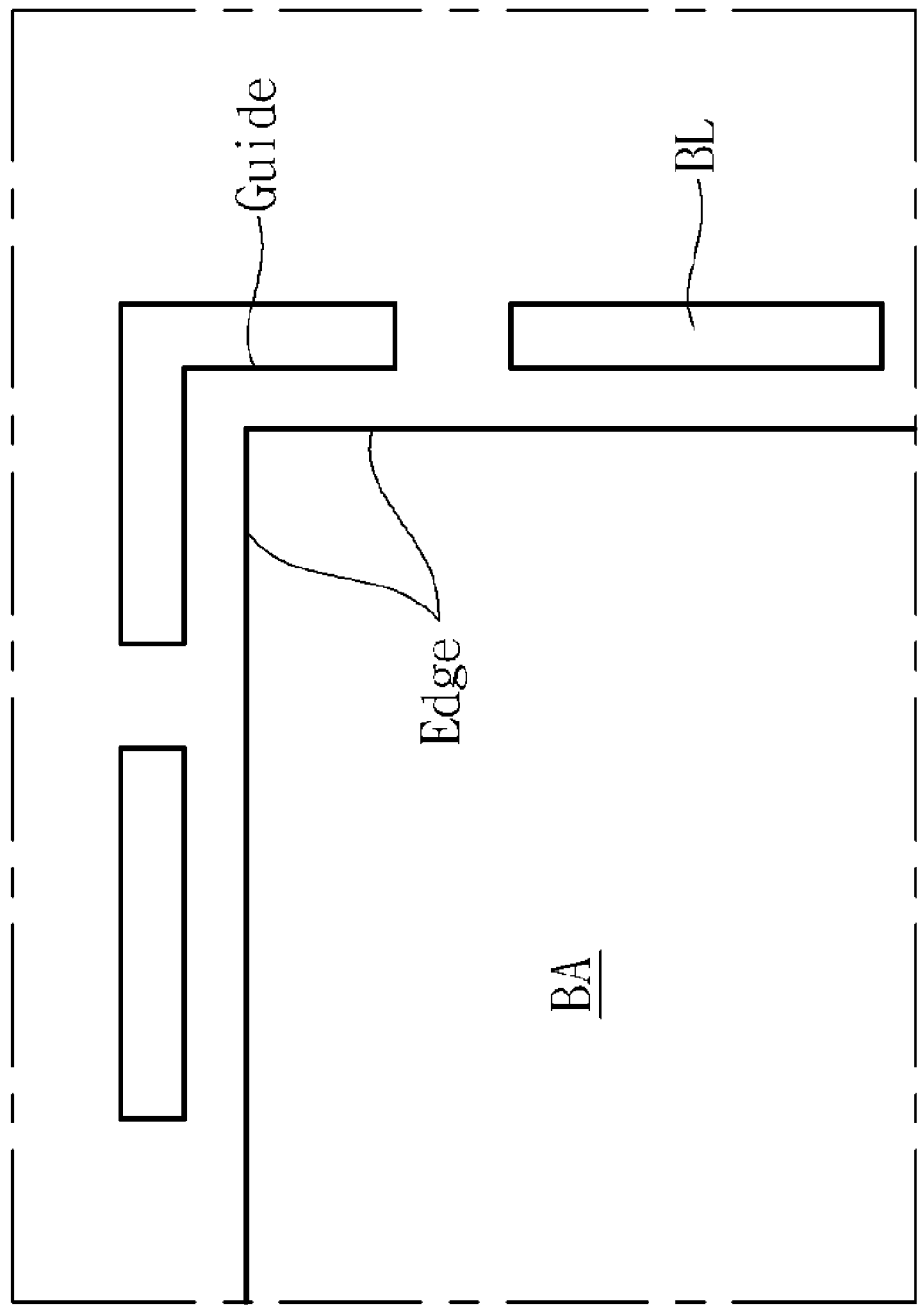
FIG. 12 is a plane view showing an aligned state of the board assembly and the backlight unit at one edge portions of the board assembly and the backlight unit.

The mounting unit includes an up/down unit 36, an XYθ table 37, an alignment vision system 51, and a two-axis robot 52 with the vision system 51 mounted thereon, and aligns the backlight unit BL transferred from the backlight unit BL feeding unit and the board assembly BA adsorbed to the index rotary unit, and then mounts the board assembly BA on the backlight unit BL. The up/down unit 36 raises the XYθ table 37 during the process of receiving the backlight unit BL from the backlight unit feeding unit. The XYθ table 37 finely moves the backlight unit BL to the x-axis and the y-axis in a direction of converging an alignment error to '0' according to an aligned state picked up by the vision system 51, and finely rotates the backlight unit BL in a θ direction. FIG. 12 shows a state in which the edge of the board assembly BA and the edge guide surface of the backlight unit BL are ideally aligned. The XYθ table 37 adjusts the posture of the backlight unit BL by finely moving the backlight unit BL to the x-axis and the y-axis and finely rotating the backlight unit BL in the θ direction until the board assembly BA and the backlight unit BL are aligned as shown in FIG. 12. The vision system 51 and the two-axis robot 52 are disposed on both sides of the mounting unit above the mounting unit. This vision system 51 picks up an aligned state of both of the board assembly BA and the backlight unit BL on the edges of the board assembly BA and the backlight unit BL by use of an image sensor, such as a camera, transmits the picked-up image in real time to a management system, and then retreats by the two-axis robot 52 so as not to interfere with the rising of the backlight unit BL for mounting the backlight unit BL after the alignment is done ideally as shown in FIG. 12.

FIGS. 7 to 10 are views showing a board assembly supply process of the index rotary unit 26, a board assembly BA barcode reading process, a protective film peeling process, and a mounting process. In FIGS. 7 to 10, these processes are simultaneously performed though each of the processes is separated for easy understanding.

Figure 7:
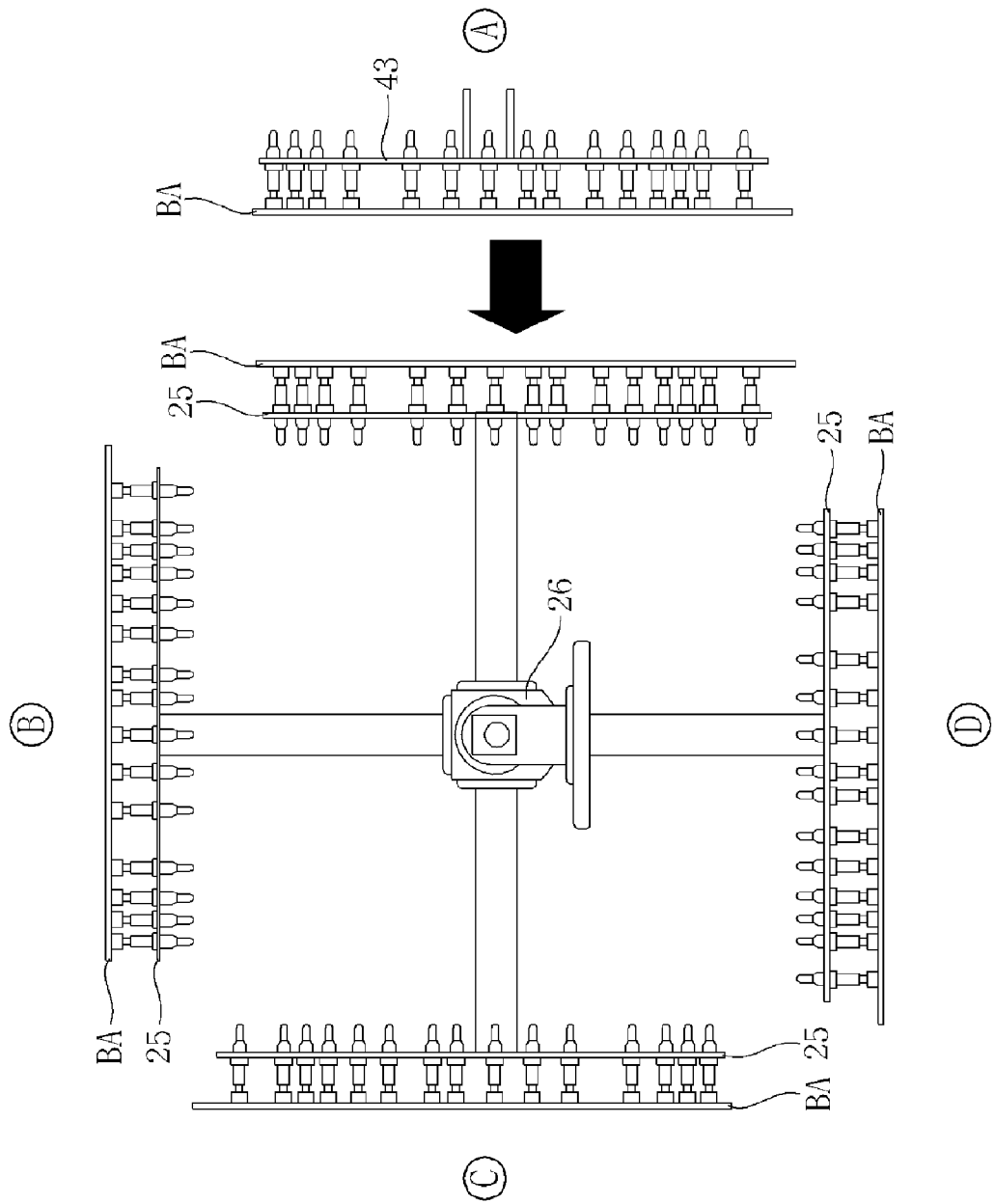
FIG. 7 is a right side view showing a board assembly supply process in the index rotary unit shown in FIGS. 4 to 6.

FIG. 7 shows a board assembly BA supply process in the index rotary unit. The board assembly BA is supplied to one adsorption head 25 of the index rotary unit from 'A' in a state of being raised by the tilting unit. The adsorption head 25 to which the board assembly BA is supplied faces in parallel with the board assembly BA.

Figure 8:
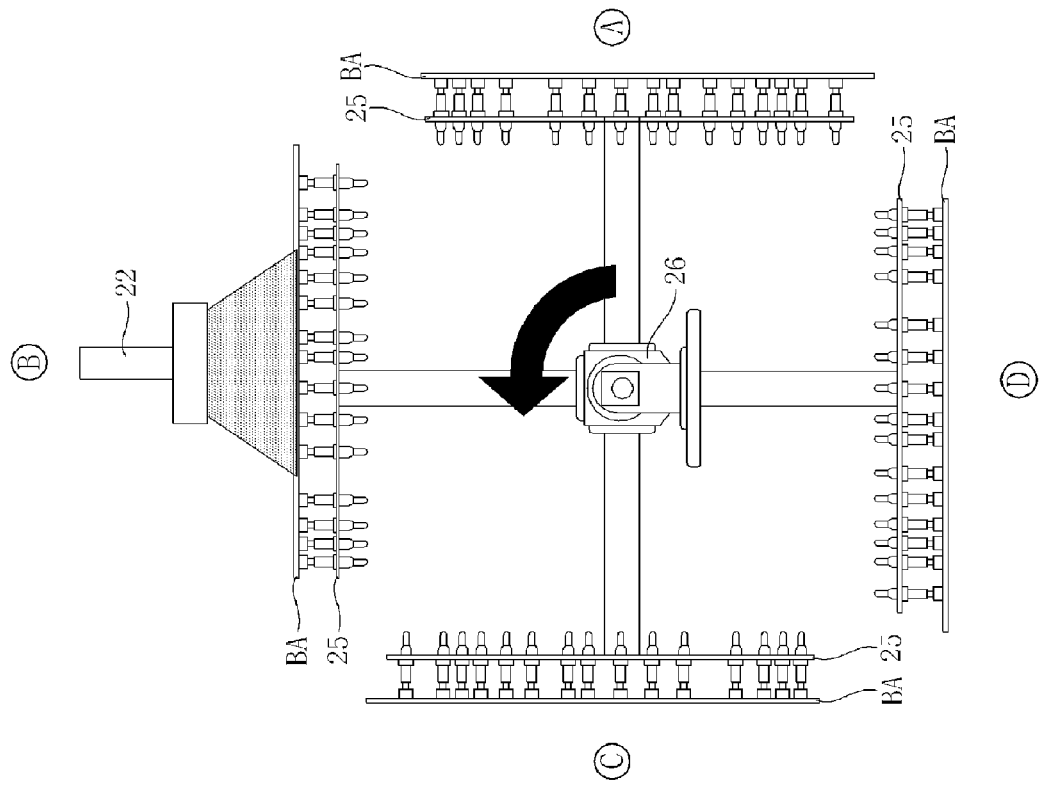
FIG. 8 is right side view showing a board assembly barcode reading process in the index rotary unit shown in FIGS. 4 to 6.

FIG. 8 shows the barcode reading process. In the board assembly BA supply process, the adsorption head 25 having adsorbed the board assembly BA turns by 90° in a counterclockwise direction and faces 'B'. The barcode reader 22 is installed so as to be opposite to the board assembly BA adsorbed to the adsorption head 25 facing 'B'. This barcode reader 22 reads out the barcode printed on the board assembly BA facing 'B' and transmits read barcode information, such as panel information, production traceability information, etc.

Figure 19:
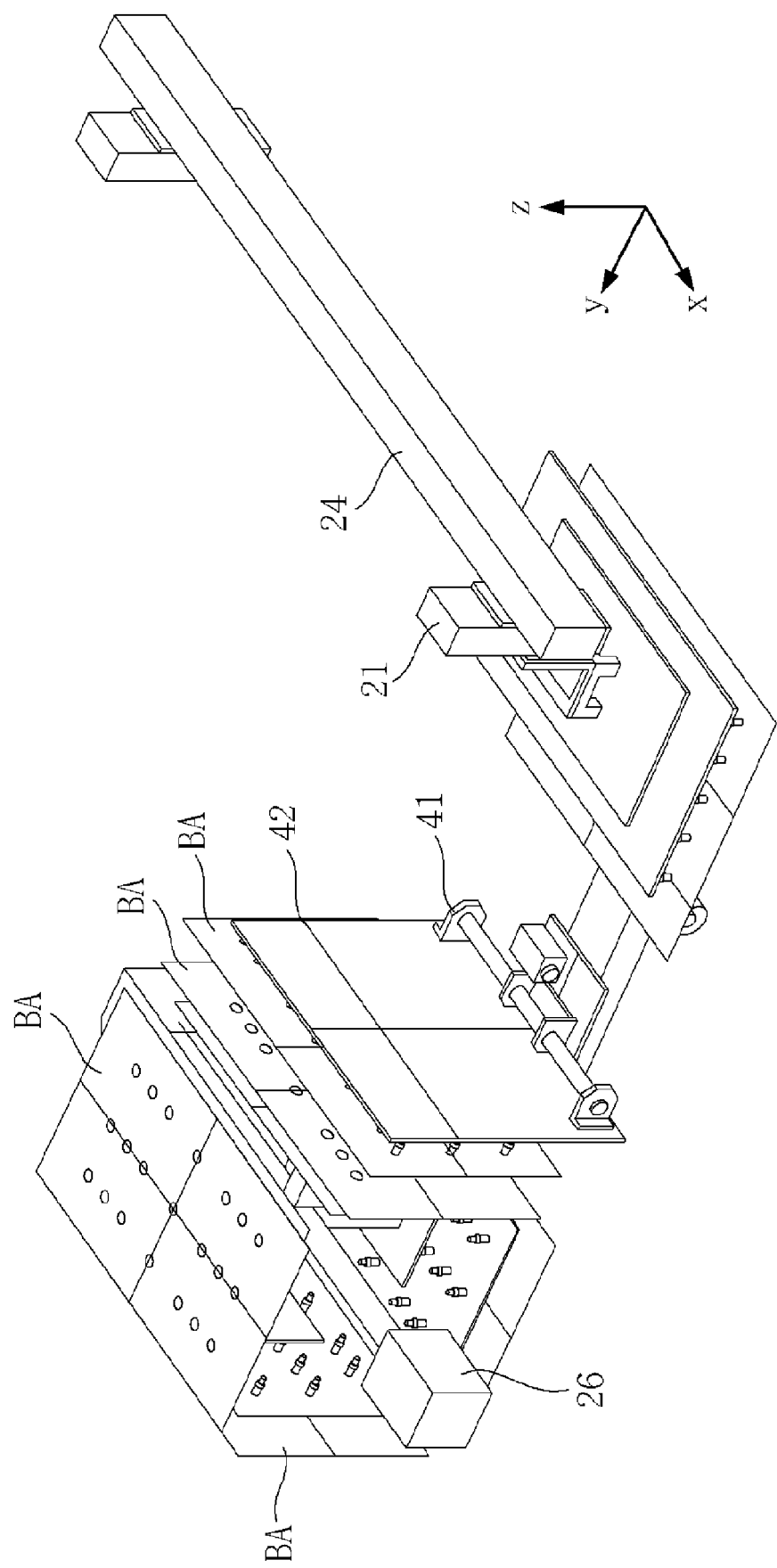

FIGS. 9A and 9B show the film peeling process. After barcode reading, the adsorption head 25 turns by 90° in a counterclockwise direction and faces 'C'. The automatic peeling machine 62 is installed so as to be opposite to the board assembly BA of the adsorption head 25 facing 'C'. The tape bar unit 61 of the automatic peeling machine 62 is adhered to one periphery of the protective film 11 of the board assembly BA facing 'C', and then peels the protective film 11 while moving in a diagonal direction of the board assembly BA. Such a film peeling process may be automated as seen in FIG. 9, and also may be performed by manual peeling by an operator as seen in FIG. 19. The manual peeling process, too, is performed simultaneously with the board assembly supply process, the board assembly BA barcode reading process, and the mounting process.

FIG. 10 shows the mounting process. After the film peeling, the adsorption head 25 turns by 90° in a counterclockwise direction and faces 'D' under the index rotary unit 26. The mounting unit is opposite to the board assembly BA facing 'D'. The mounting unit mounts the board assembly BA on the backlight unit BL by aligning the backlight unit BL and the board assembly BA facing 'B' y use of the XYθ table 37 and then raising the backlight unit BL. The adsorption head 25 facing 'D' releases vacuum after the board assembly BA is mounted by the rising of the backlight unit BL. The board assembly BA mounted on the backlight unit BL is discharged, along with the backlight unit BL, along the single-axis robot 33 of the backlight unit feeding unit and placed on a discharge tray.

As can be known from FIGS. 7 to 10, the board assembly BA supply process, the barcode reading process, the film peeling process, and the mounting process are simultaneously performed. At the same time, as described above, the backlight unit BL barcode reading process is simultaneously performed. Each of the adsorption heads 25 of the index rotary unit rotates the board assembly BA to a board assembly BA supply process position (A), a barcode reading process position (B), a film peeling process position (C), and a mounting process position (D) while rotating gradually by 90° each time.

Figure 13:
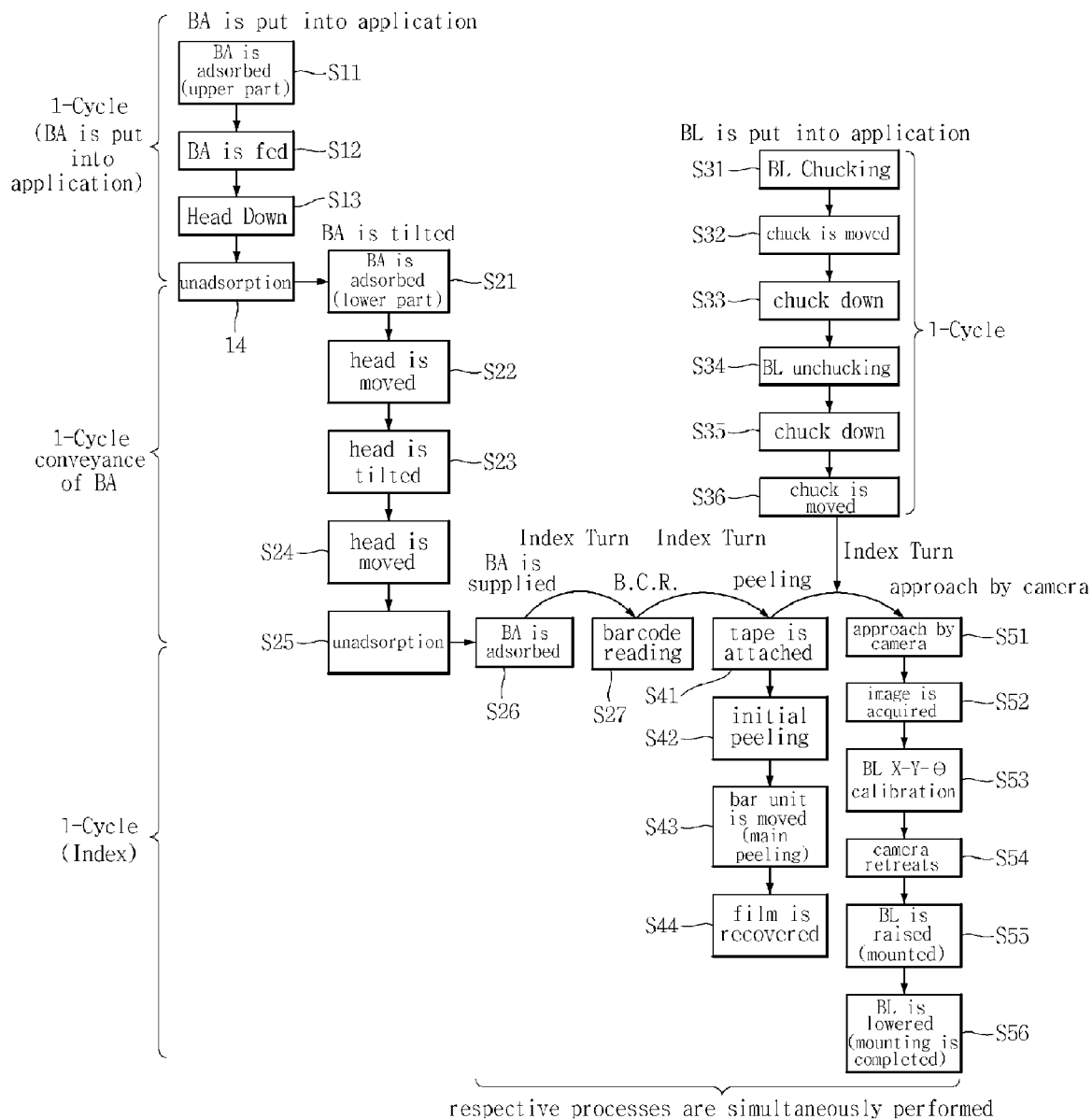
FIG. 13 is a flow chart showing by steps the control order of the peeling and mounting process in a method for manufacturing a liquid crystal display device according to an exemplary embodiment of the present invention.
Figure 14:
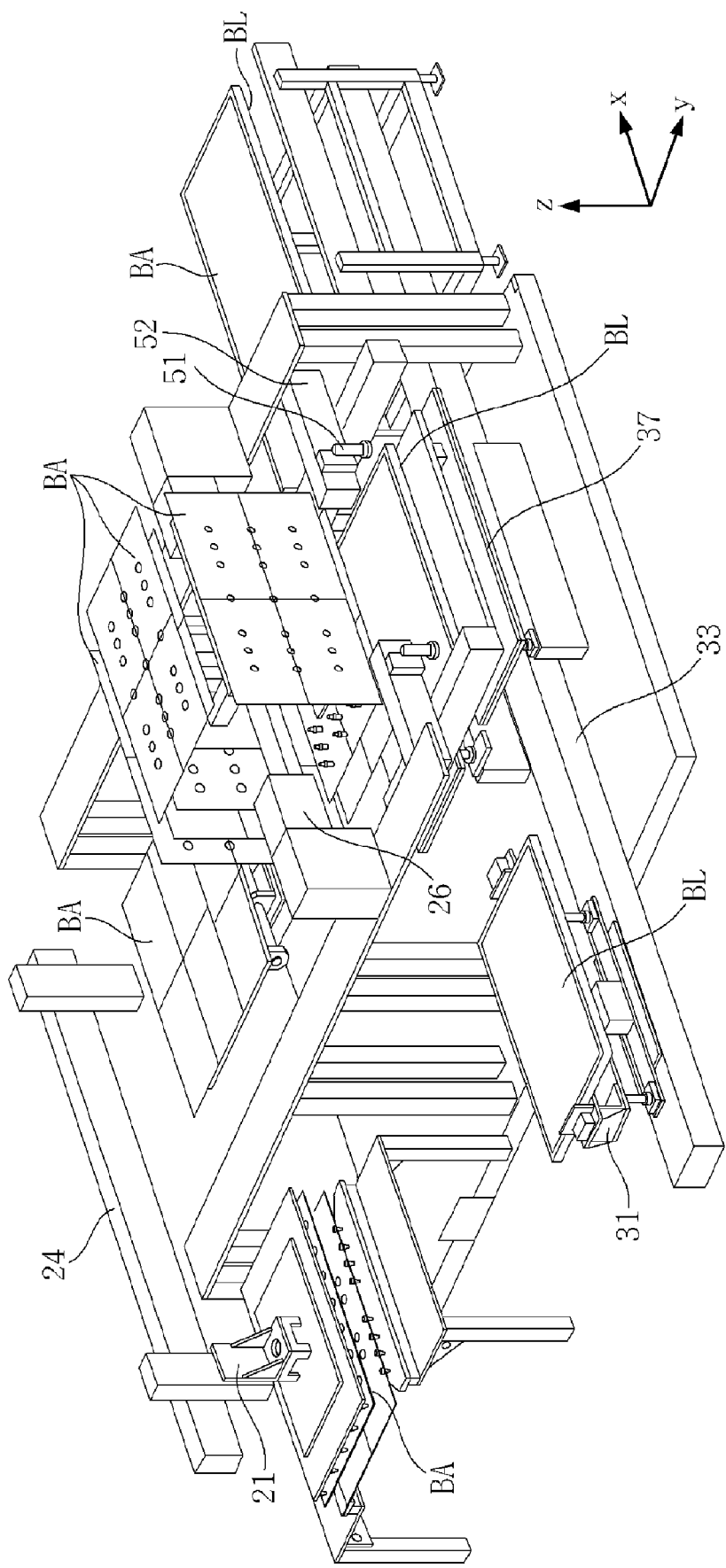
FIGS. 14 to 19 are perspective views from various angles of the integrated peeling and mounting device according to the exemplary embodiment of the present invention.
Figure 15:
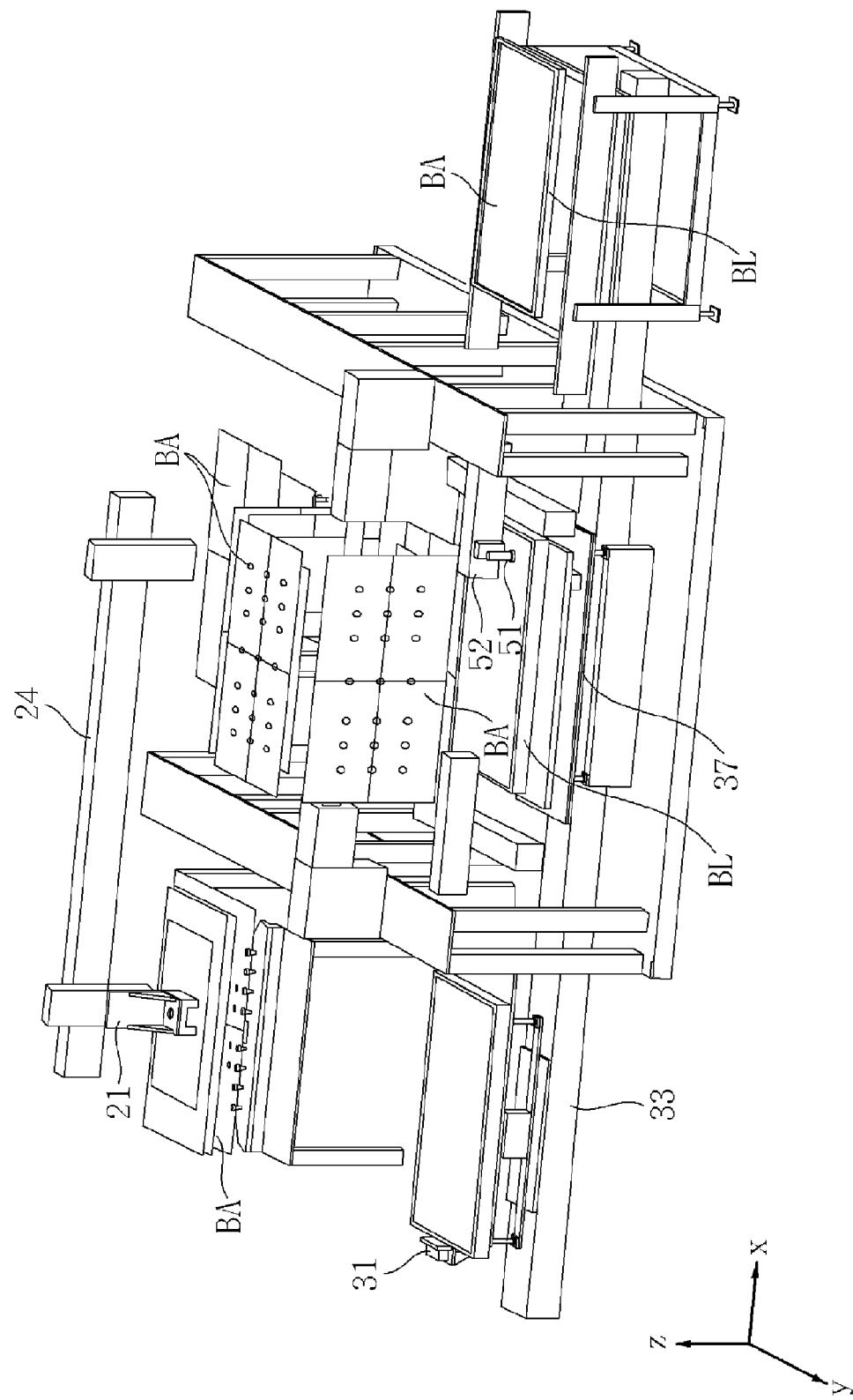
Figure 16:
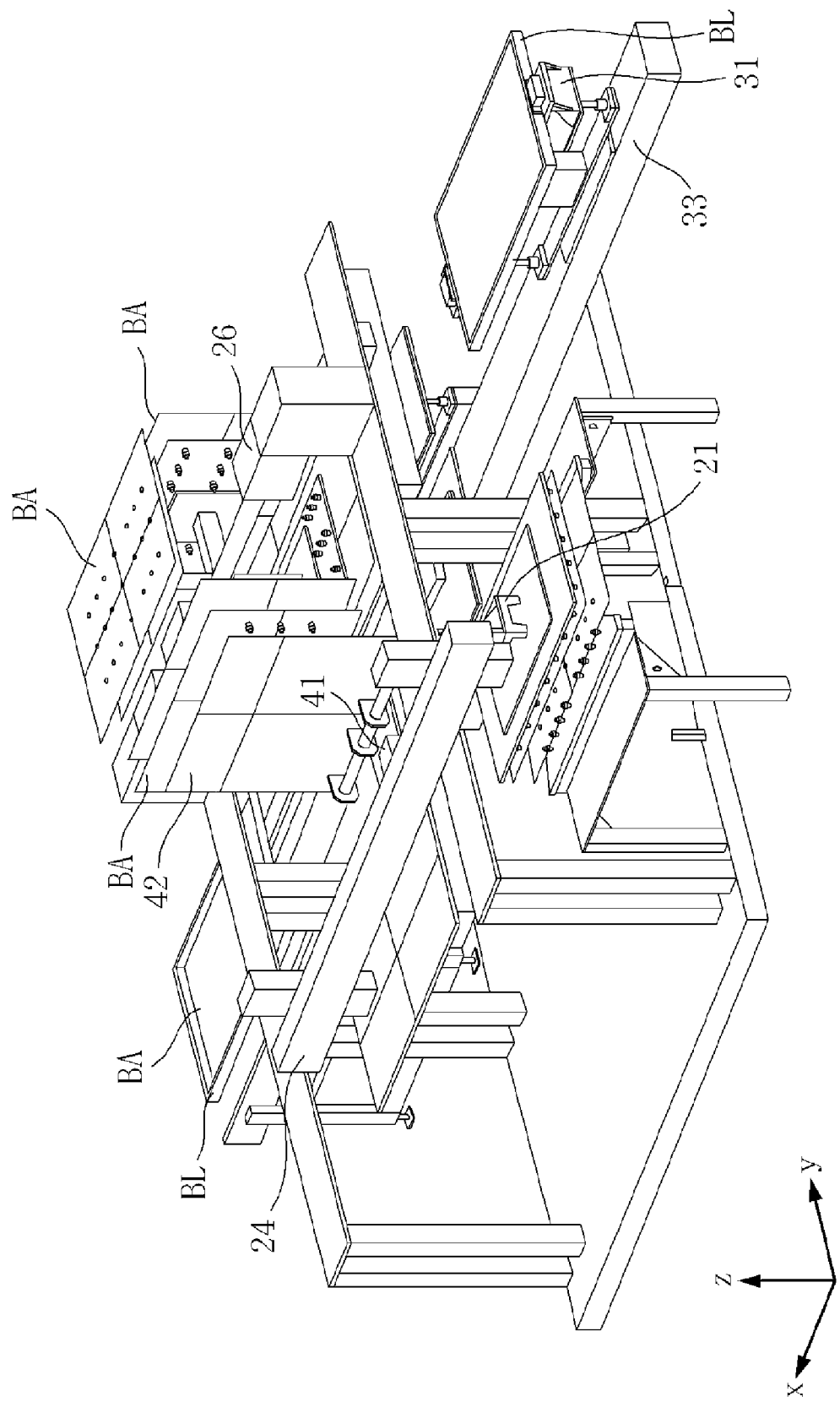
Figure 17:
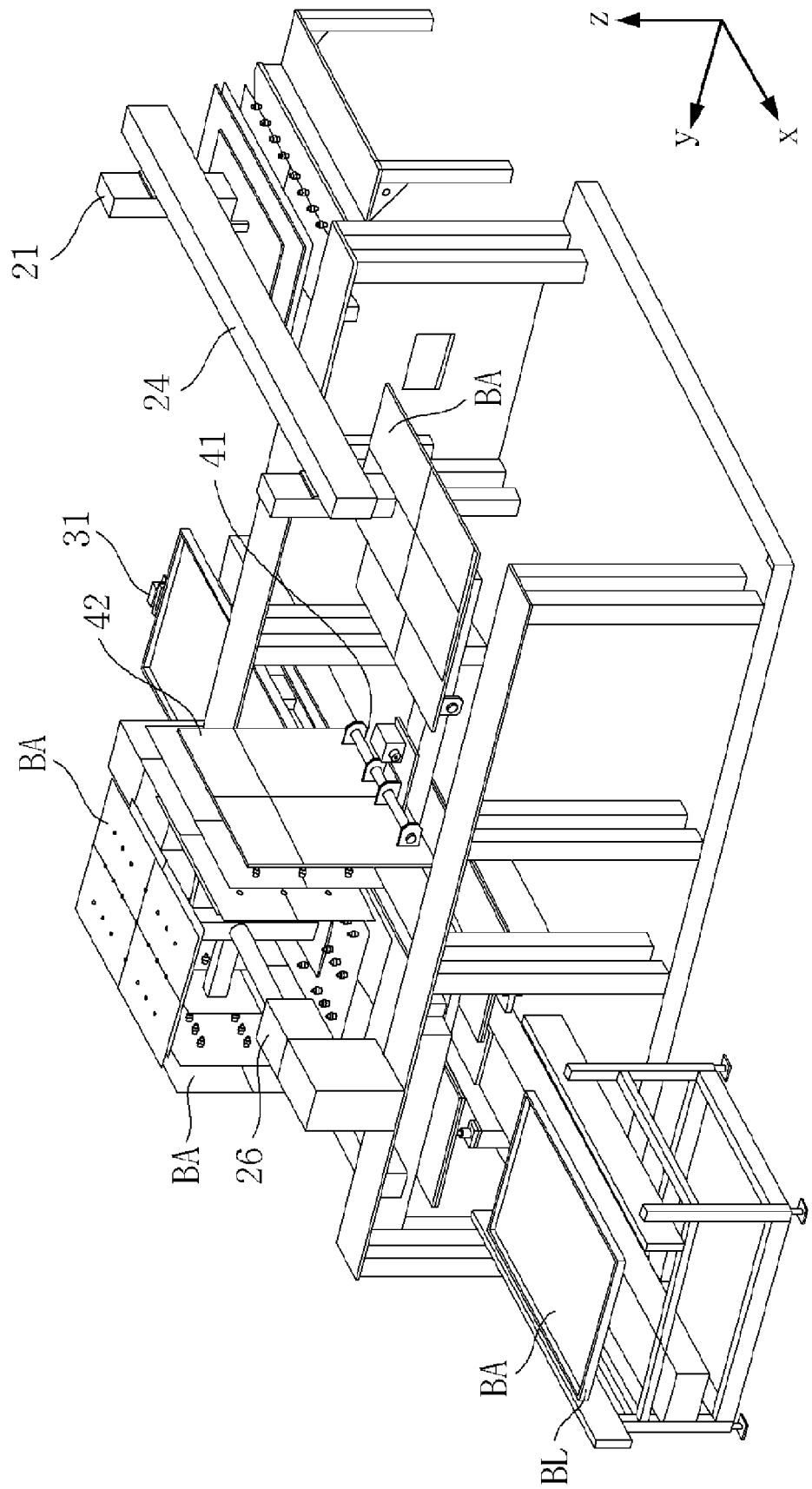
Figure 18:
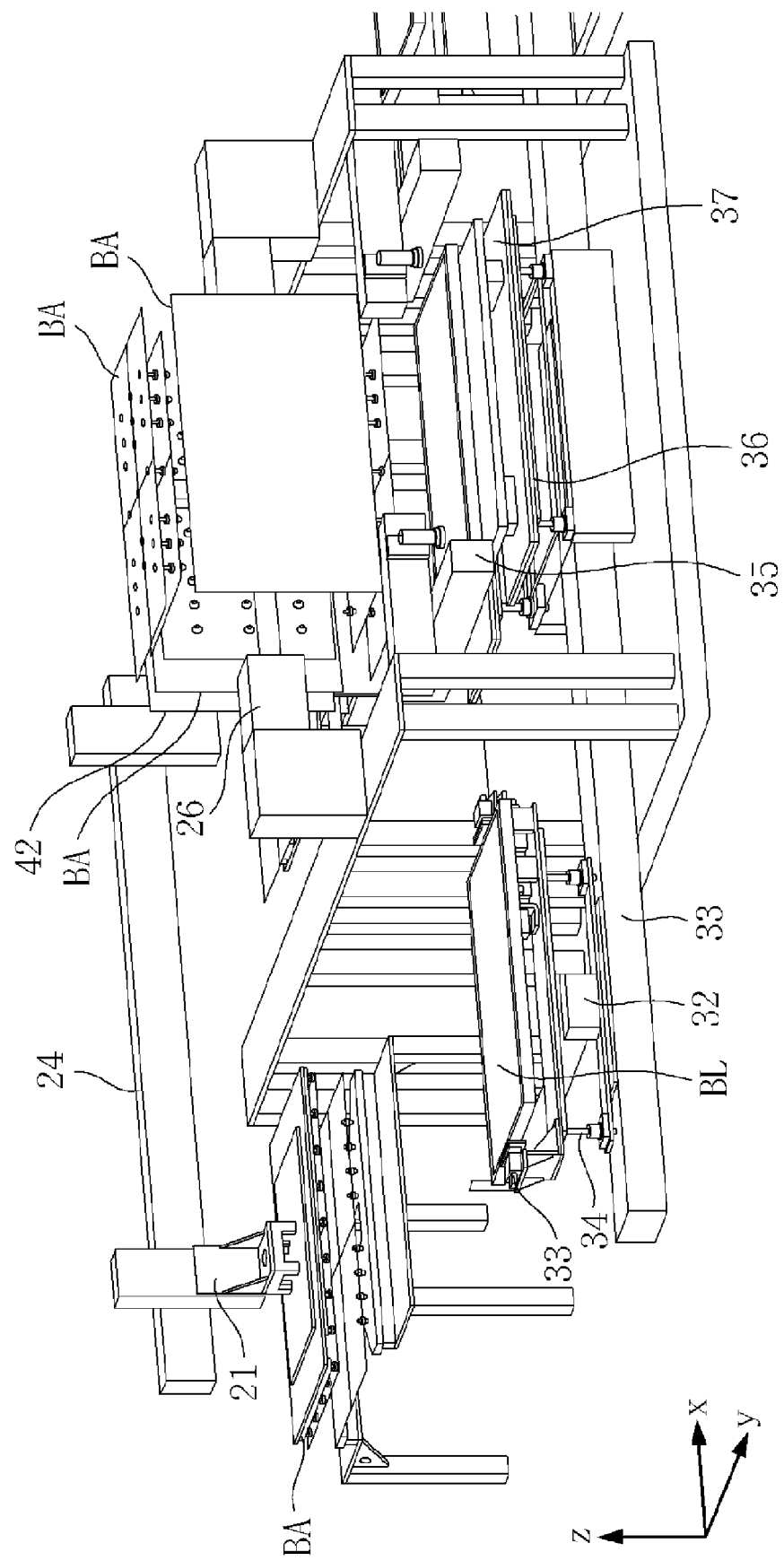

FIG. 13 is a flow chart showing by steps the control order of the peeling and mounting process in a method for manufacturing a liquid crystal display device according to an exemplary embodiment of the present invention. This peeling and mounting process is controlled by a PLC (Programmable Logic Controller) of the management system.

In the peeling and mounting process according to the exemplary embodiment of the present invention, a board assembly BA is vacuum-adsorbed to an adsorption pad of a head 21 and then the head 21 is fed to a tilting unit (S11 and S12). The head 21 is lowered from the top of the adsorption head 43 of the tilting unit and then vacuum-released (S13 and S14). The processes S11 to S13 correspond to 1 cycle operation of a board assembly feeding unit.

In the peeling and mounting process according to the exemplary embodiment of the present invention, the board assembly BA is adsorbed to an adsorption head 43 of the tilting unit, and the adsorption head 43 is moved to the index rotary unit 26 (S21 and S22). Next, the adsorption head 43 is tilted at 90° to vertically adjust the posture of the board assembly (S23), and then the board assembly BA in the vertical state is moved again by an infinitesimal distance to approach the adsorption head 25 of A side of the index rotary unit (S24). Immediately after the board assembly BA is adsorbed to the A side adsorption head 25 of the index rotary unit, vacuum is released on the adsorption head 43 of the tilting unit (S25). The processes S21 to S25 correspond to 1 cycle operation of the tilting unit.

A backlight unit BL feeding unit feeds a backlight unit BL to a mounting unit during the processes S11 to S25. First, the backlight unit BL supplied in the previous process is held (or chucked) by a chucking unit 31 (S31). The board assembly BA chucked by the chucking unit 31 is moved to the mounting unit along a single-axis robot 33, the board assembly BA is transferred onto an XYθ table 37 of the mounting unit, and then is unchucked and lowered and moved by the up/down driving unit 32 (S32 to S35). The processes S31 to S36 correspond to 1 cycle operation of the backlight unit feeding unit and are finished before the process S51.

Subsequent to the process S25, in the peeling and mounting process according to the exemplary embodiment of the present invention, the board assembly BA is adsorbed to the adsorption head of A position (S26), and then the four adsorption heads 25 simultaneously turn by 90° firstly to move the board adsorption head 25 of A position to B position and read out the barcode of the board assembly BA (S27).

Subsequent to the process S27, in the peeling and mounting process according to the exemplary embodiment of the present invention, the four adsorption heads 25 of the index rotary unit turn again by 90°. By the rotation of the index rotary unit, the adsorption head 25 having finished the barcode reading process at B position is moved to C position. A tape bar unit 61 of an automatic peeling machine is attached to one periphery of a protective film of the board assembly BA (S41), and then the protective film 11 is peeled in the initial stage by being lifted from the board assembly BA and is continuously moved to make the protective film 11 peeled more and more (S42 and S43). The peeled protective film 11 is recovered (S44). The automatic peeling process of the steps S41 to S44 can be replaced by a manual peeling process.

Subsequent to the process S44, the peeling and mounting process according to the exemplary embodiment of the present invention, the four adsorption heads 25 of the index rotary unit turn again by 90°. By the rotation of the index rotary unit, the adsorption head 25 having finished the barcode reading process at C position is moved to D position. An alignment vision system 51 approaches near the edges of the board assembly BA and the backlight unit BL by means of a two-axis robot 52 to acquire an image of near the edges (S51 and S52). As a result of reading out the thus-acquired image, the XYθ table 37 supporting the board assembly BA from underside finely moves the board assembly BA in a two-axis direction of the x-axis and y-axis until the aligned state as shown in FIG. 12 is achieved, and the board assembly BA is tilted in a θ direction to calibrate the aligned state. After completion of the alignment calibration, the XYθ table 37 is raised to mount the board assembly BA on the backlight unit BL and then is lowered.

The processes S25 to S27 and the processes S41 to S56 correspond to the operation of the index rotary unit.

FIGS. 14 to 20 are perspective views from various angles of the integrated peeling and mounting device according to the exemplary embodiment of the present invention for easy understanding of the configuration of the device.

As described in detail above, the integrated peeling and mounting device according to the exemplary embodiment and the method for manufacturing a liquid crystal display device using the same can shorten the feeding path and minimize the standby time of the board assembly BA and the backlight unit BL.

Furthermore, the integrated peeling and mounting device according to the exemplary embodiment and the method for manufacturing a liquid crystal display device using the same can reduce the time taken for the peeling and mounting processes, further, the peeling, barcode reading, and mounting processes, to less than 10 seconds and reduce equipment size and equipment installation space by separating the functions of peeling and mounting in the device, and also can minimize impurity contamination of the board assembly BA and the backlight unit BL.

Furthermore, the integrated peeling and mounting device according to the exemplary embodiment and the method for manufacturing a liquid crystal display device using the same can perform automatic peeling in a state in which the board assembly BA is vertically raised by installing the automatic peeling machine so as to be opposite to one side of the index rotary unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for manufacturing a liquid crystal display device, comprising steps of:
   providing an integrated peeling and mounting device having an index rotary unit having a shaft for rotating heads facing in different directions, an alignment calibration unit and a mounting unit;
   rotating the index rotary unit;

calibrating an aligned state of a board assembly and a backlight unit by operating the alignment calibration unit;

mounting the board assembly attached to a first head of the index rotary unit on the backlight unit by operating the mounting unit; and peeling a film from the board assembly attached to a second head of the index rotary unit, wherein the steps of peeling the film and mounting the board assembly on the backlight unit are simultaneously performed.

2. The method of claim 1, further comprising reading out a barcode of the board assembly attached to a third head of the index rotary unit.

3. The method of claim 2, further comprising vertically raising the board assembly of the horizontal state and transferring the board assembly to a fourth head of the index rotary unit by using a tilting unit.

4. The method of claim 3, further comprising:

transferring the board assembly in the horizontal state to an adsorption head of the tilting unit; and supplying the backlight unit to a mounting position of the board assembly and the backlight unit.

5. The method of claim 1, wherein the process of mounting the board assembly on the backlight unit further comprises:

picking up the aligned state of the board assembly and the backlight unit; and finely moving the backlight unit to the x-axis and the y-axis according to the aligned state of the board assembly and the backlight unit picked up by the vision system and rotating the backlight unit in a θ direction by using an XYθ table supporting the backlight unit from underside.

6. The method of claim 5, wherein the process of picking up the aligned state of the board assembly and the backlight unit comprises picking up the aligned state of an edge of the board assembly and an edge of the backlight unit by use of an image sensor.

7. The method of claim 1, wherein the film peeling process comprises automatically peeling the film attached onto the board assembly attached to the second head by using an automatic peeling machine.

* * * * *